United States Patent [19]

van der Steen et al.

[11] 4,336,048

[45] Jun. 22, 1982

[54] METHOD OF PRODUCING DOPED QUARTZ GLASS

[75] Inventors: Gerardus H. A. M. van der Steen; Eddy F. C. Van Hove, both of Eindhoven, Netherlands

[73] Assignee: U.S. Philips Corporation, New York, N.Y.

[21] Appl. No.: 147,893

[22] Filed: May 8, 1980

[30] Foreign Application Priority Data

May 16, 1979 [NL] Netherlands ............................ 7903842

[51] Int. Cl.³ .......................... C03C 3/06; C03B 20/00
[52] U.S. Cl. ......................................... 65/18.4; 65/32; 65/134; 501/54
[58] Field of Search ............. 65/134, 137, 32, DIG. 8, 65/18.4; 106/DIG. 8; 501/54

[56] References Cited

U.S. PATENT DOCUMENTS 3,764,286 10/1973 Antczak et al. ....................... 65/134
4,013,436 3/1977 van der Steen ................... 65/134 X

FOREIGN PATENT DOCUMENTS 51-77612 6/1976 Japan ...................................... 65/134
508013 6/1939 United Kingdom .
1036477 7/1966 United Kingdom .
1202852 8/1970 United Kingdom .

Primary Examiner—Richard V. Fisher
Attorney, Agent, or Firm—Paul R. Miller

[57] ABSTRACT

Doped quartz glass is produced by fusing a mixture of quartz powder with a concentrate. The concentrate consists of quartz powder and the oxides of alkaline earth metals and/or alkali metals (dopants). By adding a small quantity of dopants, a doped quartz glass can be obtained having a viscosity behavior corresponding to that of Vycor glass. Still softer glasses can be obtained by the addition of some more dopants.

3 Claims, 1 Drawing Figure

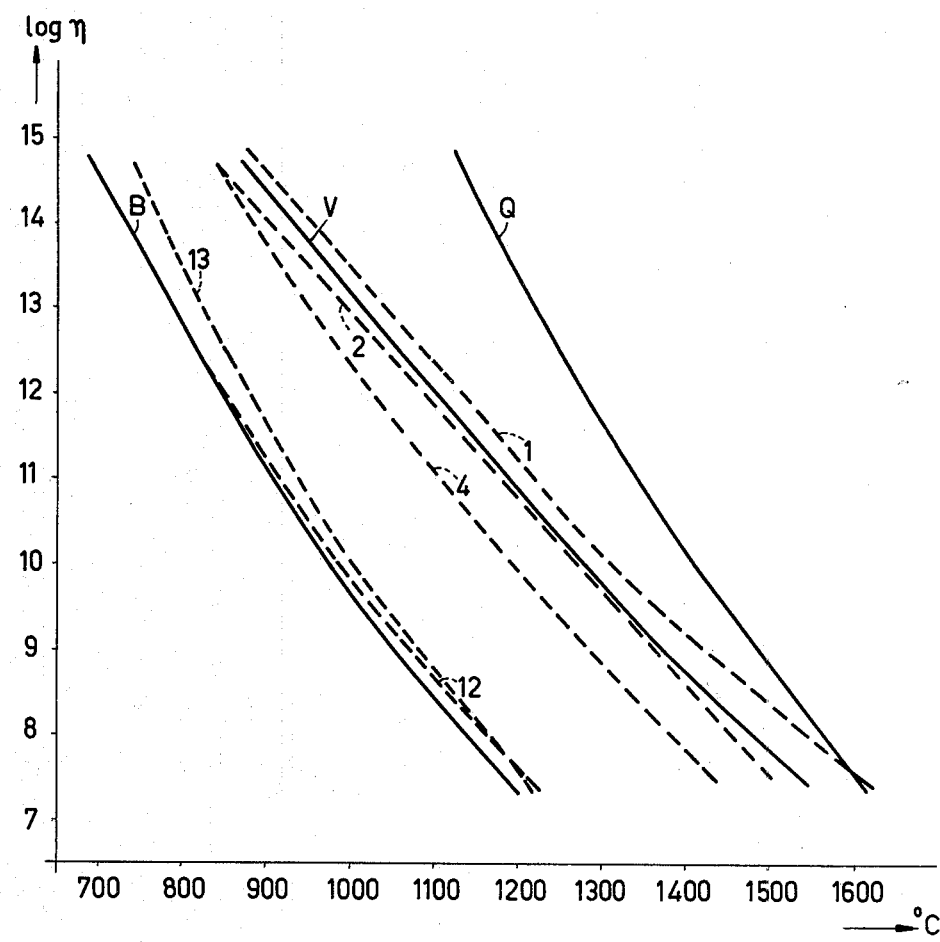

METHOD OF PRODUCING DOPED QUARTZ GLASS

The invention relates to a method of producing doped quartz glass by melting quartz powder with dopants and then cooling the melt. The invention also relates to objects produced from the quartz glass thus obtained.

The invention provides a method of producing soft quartz glass, that is to say quartz glass having a lower viscosity than that of pure quartz glass.

For many uses, for example for the bulb of halogen incandescent lamps, ordinary glass is too soft. Quartz glass is mostly used for such cases. It is, however, difficult to melt pure quartz glass of a good optical quality, as is required for lamp glass. Vycor glass of Corning glassworks was developed for such uses. The method of producing this glass is rather complicated; an alkalimetalborosilicate glass is melted and is made into the desired shape. A heat treatment is thereafter performed, resulting in two phases. One of these phases is leached out with warm mineral acids, a phase having approximately 96 mol. % $SiO_2$ and 3 mol. % $B_2O_3$ remaining behind, which is then densely sintered (Vycor glass).

It has recently become possible to produce pure quartz glass of an optically good quality by means of the so-called $He/H_2$ process: in this method quartz powder is melted in a helium atmosphere containing hydrogen. This method is described in U.S. Pat. No. 3,764,286 which is incorporated in this description by reference.

However, the quartz glass obtained by means of the $He/H_2$ process is much harder than Vycor glass. Therefore, the use of the $He/H_2$ process for obtaining optically good quartz glass would render it necessary to adapt the developed technology (and the associated devices) for the processing of Vycor glass.

Doped quartz glass containing 50 to $200 \times 10^{-3}$ mol. % potassium and/or magnesium oxide and/or 5 to $200 \times 10^{-3}$ mol. % calcium, barium and/or strontium oxide has already been produced in accordance with the $He/H_2$ process. These oxides are added to reduce the formation of bubbles in the quartz (German patent application No. 25.50.929) corresponding to U.S. Pat. No. 4,013,436. In order to introduce the oxides into the quartz, quartz powder which has been wetted with a solution of the nitrate of the relevant cation is used as the starting material. Oxides are formed from the nitrates by decomposition at elevated temperatures (approximately 1000° C.). These oxides are often hygroscopic and can absorb $CO_2$, which may give rise to the formation of scum in the melt, when these oxides are not stored and worked up in a moisture-free state.

It is an object of the invention to provide a method of producing doped quartz glass having a lower viscosity then that of pure quartz glass, wherein the above-mentioned scum formation is avoided and which allows the addition of hygroscopic dopants.

The method is based on the recognition of the fact that a mixture of quartz powder with a concentrate of quartz together with the desired dopants can be melted without problems. By adding the dopants in the form of a concentrate, the above-mentioned problems with respect to hygroscopicity and scum formation do not occur.

The method according to the invention is characterized in that a mixture of quartz powder with a concentrate consisting of a sintered or premelted mixture of a dopant and quartz powder is melted and then the melt is cooled. It is known per se to use concentrates for melting ordinary glass when one wants to incorporate volatile dopants in a glass melt (United Kingdom Pat. Nos. 1,036,477 and 1,202,852).

In order to improve the resistance to atmospheric corrosion of the concentrate, it may, in addition, contain $Al_2O_3$, $TiO_2$ and/or $ZrO_2$. It appeared that the oxides of one or more of the alkali metals or alkaline earth metals effect a considerable decrease of the viscosity, even when small quantities of these oxides are used.

Netherlands Pat. No. 52053 (corresponding to U.K. Pat. No. 508,013) describes a method of sintering quartz powder wherein 2% by weight of alkali metal oxides are added to the quartz powder to be sintered. According to this patent specification, the physical properties of the sintered products are substantially not affected.

Quartz glass containing up to 3 mol. % of dopants, prepared by the method according to the invention has, however, already a greatly reduced viscosity. It was surprisingly found that doped quartz glass to which not more than 0.5 mol. % of dopants had been added has a viscosity behaviour corresponding to that of the known Vycor glass or is even considerably softer.

The invention will be explained with reference to a FIGURE in which the temperature dependences of viscosity of a few glasses according to the invention (nos. 1, 2, 4, 12, 13), of pure quartz glass (Q), of Vycor glass (V) and of a borosilicate glass (B) are shown. In this FIGURE the temperature is plotted in degrees Celsius on the horizontal axis and the logarithm of the viscosity is shown (in poises) on the vertical axis.

According to the invention there is provided a method of producing doped quartz glass, that is to say glass containing not less than 0.035 mol. % and not more than 3 mol. % of dopants (computed on the basis of the oxides). In the method according to the invention the starting material is a quartz powder having a purity of not less than 99.99 mole % $SiO_2$. It was surprisingly found that incorporation of low dopant contents effect a considerable reduction of the viscosity. Contents of dopants up to 0.5 mol. % result already in a doped quartz glass having viscosity properties corresponding to those of Vycor glass (having 4 mol. % of dopants). The method according to the invention is preferably performed in accordance with the $He/H_2$ process. In this process quartz powder is continuously fed to a melting furnace, and molten quartz glass is continuously discharged from the furnace. This method is performed in a $He/H_2$ atmosphere. In the method according to the invention the quartz powder may be mixed with a pulverized concentrate. This concentrate has been obtained by sintering or fusion of quartz with the desired dopants. Suitable admixtures are the oxides of Li, Na, K, Rb, Cs, Mg, Ca, Sr, Ba or mixtures thereof. Furthermore, $TiO_2$, $Al_2O_3$ and/or $ZrO_2$ can be added. Such concentrates may have a ceramic or a vitreous nature.

EXAMPLES

Fourteen different samples of doped quartz glass were made starting from quartz powder and one of the following concentrates (Table A). The mixture of quartz powder and ground concentrate can be fused to an optically good quartz glass without any problems by using the $He/H_2$ process. No special measures need be taken to prevent $H_2O$ and $CO_2$ from being drawn in.

TABLE A

| concen-trate | nature | \multicolumn{5}{c}{composition (mole %)} | | | | |
| --- | --- | --- | --- | --- | --- | --- |
| | | $SiO_2$ | $K_2O$ | MgO | CaO | BaO | $Al_2O_3$ |
| A | ceramic | 66,63 | — | — | — | 33,37 | — |
| B | glass | 75,30 | 20,0 | 4,70 | — | — | — |
| C | glass | 72,26 | 21,56 | — | — | — | 6,18 |
| D | glass | 70,31 | 20,01 | — | — | — | 9,68 |
| E | glass | 69,27 | 20,28 | 9,81 | — | — | 1,94 |
| F | glass | 71,94 | 22,18 | — | — | 3,76 | 2,12 |
| G | glass | 73,00 | 11,46 | 2,01 | 7,82 | 3,52 | 2,18 |
| H | glass | 75,72 | 11,89 | 2,08 | 2,25 | 5,80 | 2,27 |

The following Table B shows the composition of the quartz glasses obtained as well as the concentrate used for making each quartz glass.

TABLE B

| Glass No. | con-cen-trate used | \multicolumn{6}{c}{Composition (mole %)} | | | | | |
| --- | --- | --- | --- | --- | --- | --- | --- |
| | | $SiO_2$ | $K_2O$ ($\times 10^{-2}$) | MgO ($\times 10^{-2}$) | CaO ($\times 10^{-2}$) | BaO ($\times 10^{-2}$) | $Al_2O$ ($\times 10^{-2}$) |
| 1 | A | 99,89 | — | — | — | 11,0 | — |
| 2 | A | 99,67 | — | — | — | 33,0 | — |
| 3 | F | 99,86 | 11,0 | — | — | 1,8 | 1,2 |
| 4 | F | 99,93 | 5,4 | — | — | 1,2 | 0,6 |
| 5 | F | 99,965 | 2,8 | — | — | 0,5 | 0,2 |
| 6 | H | 99,94 | 3,1 | 0,5 | 0,6 | 1,5 | 0,6 |
| 7 | G | 99,93 | 3,1 | 0,5 | 2,1 | 1,0 | 0,6 |
| 8 | E | 99,91 | 5,5 | 2,7 | — | — | 0,6 |
| 9 | F | 99,71 | 23,0 | — | — | 3,9 | 2,3 |
| 10 | F | 99,42 | 46,0 | — | — | 7,8 | 4,7 |
| 11 | D | 99,32 | 45,9 | 22,4 | — | — | — |
| 12 | D | 98,63 | 92,7 | 44,8 | — | — | — |
| 13 | B | 98,58 | 92,9 | 22,5 | — | — | 26,6 |
| 14 | C | 98,80 | 93,0 | — | — | — | 26,7 |

Note:
$Al_2O_3$ was added to glass no.13 in addition to the concentrate.

The glasses 1 to 8 inclusive had a viscosity which was approximately the same as that of the Vycor glass; the glasses 12 to 14 inclusive had a viscosity corresponding to the viscosity of a known borosilicate glass (84.65 mol. % $SiO_2$, 9.99 mol. % $B_2O_3$, 1.12 mol. % CaO and 4.31 mol. % $Al_2O_3$). The glasses 9 to 11 inclusive had a viscosity located between the viscosities of the above-mentioned Vycor glass and of the borosilicate glass. All this is shown in the FIGURE. The numbers shown next to the curve correspond with the numbers in Table B; Q indicates the viscosity of pure quartz glass; B is the viscosity of the above-mentioned borosilicate glass and V the viscosity of the Vycor glass.

What is claimed is:

1. A method of producing doped quartz glass having a lower viscosity than that of pure quartz glass comprising: forming a concentrate of quartz powder and at least one dopant by sintering or premelting, melting a mixture of quartz powder and said concentrate in an amount containing from 0.035 to 3 mol. % of dopants (computed on the basis of the oxides) in the produced doped quartz glass, and cooling the melt, wherein said quartz powder has a purity of at least 99.99 mol. % as a starting material.

2. A method according to claim 1, wherein said concentrate contains an oxide of at least one alkali metal as a dopant or alkaline earth metal as a dopant.

3. A method according to one of claim 1 or claim 2, wherein said concentrate contains a maximum of 0.5 mol. % of dopants (computed on the basis of the oxides) in the produced doped quartz glass.

* * * * *